United States Patent
McCaully

[15] 3,678,043
[45] July 18, 1972

[54] 2,3-DIHYDRO-2-OXO-1H-1,4-BENZODIAZEPINE-3-CARBOXYLIC ACID ESTERS AND RELATED COMPOUNDS

[72] Inventor: Ronald J. McCaully, Malvern, Chester, Pa.

[73] Assignee: American Home Products Corporation, New York, N.Y.

[22] Filed: March 14, 1966

[21] Appl. No.: 533,854

[52] U.S. Cl. .................. 260/239.3 D, 424/244, 424/275, 260/332.3, 260/570
[51] Int. Cl. ........................................................ C07d 41/00
[58] Field of Search .................................. 260/239.3, 239.3 D

[56] References Cited

UNITED STATES PATENTS

| | | | |
|---|---|---|---|
| 3,100,770 | 8/1963 | Fryer et al. | 260/239.3 |
| 3,270,053 | 8/1966 | Reeder et al. | 260/239.3 |
| 3,371,083 | 2/1968 | Fryer et al. | 260/239.3 |
| 3,371,084 | 2/1968 | Fryer et al. | 260/239.3 |

FOREIGN PATENTS OR APPLICATIONS

| | | | |
|---|---|---|---|
| 650,637 | 12/1965 | Netherlands | 260/239.3 |

*Primary Examiner*—Henry R. Jiles
*Assistant Examiner*—Robert T. Bond
*Attorney*—Andrew Kafko, Edmund H. O'Brien, Joseph Martin Weigman and Dwight J. Potter

[57] ABSTRACT

The disclosure is directed to 2,3-dihydro-2-oxo-1H-1,4-benzodiazepine-3-carboxylic acid esters; 2,3-dihydro-3-hydroxy-2-oxo-1H-1,4-benzodiazepine-3-carboxylic acid esters and 3-alkoxy-2,3-dihydro-2-oxo-1H-1,4-benzodiazepine-3-carboxylic acid esters and to novel methods for their preparation. The compounds have therapeutic activity as central nervous system depressants and as intermediates in the production of 3-alkoxy-1,3-dihydro-2H-1,4-benzodiazepin-2-ones, and 1,3-dihydro-3-hydroxy-2H-1,4-benzodiazepin-2-ones.

13 Claims, No Drawings

2,3-DIHYDRO-2-OXO-1H-1,4-BENZODIAZEPINE-3-CARBOXYLIC ACID ESTERS AND RELATED COMPOUNDS

This invention relates to new and useful benzodiazepine-3-carboxylic acid esters as well as to novel methods for their preparation. In particular, the present invention is concerned with 2,3-dihydro-2-oxo-1H-1,4-benzodiazepine-3-carboxylic acid esters; 2,3-dihydro-3-hydroxy-2-oxo-1H-1,4-benzodiazepine-3-carboxylic acid esters and 3-alkoxy-2,3-dihydro-2-oxo-1H-1,4-benzodiazepine-3-carboxylic acid esters having therapeutic activity and value as intermediates.

The novel compounds of this invention are represented by the following formula:

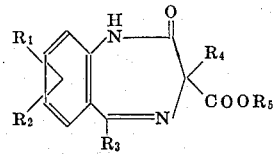

wherein $R_1$ and $R_2$ are each selected from the group consisting of hydrogen, halogen, nitro, halo(lower)alkyl, and lower alkylsulfonyl; $R_3$ is selected from the group consisting of thienyl, phenyl, halophenyl, lower alkoxyphenyl and halo(lower)alkylphenyl; $R_4$ is selected from the group consisting of hydrogen, hydroxy and lower alkoxy; and $R_5$ is lower alkyl. Specific examples of such compounds include: 7-chloro-2,3-dihydro-2-oxo-5-phenyl-1H-1,4-benzodiazepine-3-carboxylic acid, ethyl ester; 7-chloro-2,3-dihydro-3-hydroxy-2-oxo-5-phenyl-1H-1,4-benzodiazepine-3-carboxylic acid, ethyl ester and 7-chloro-2,3-dihydro-3-methoxy-2-oxo-5-phenyl-1H-1,4-benzodiazepine-3-carboxylic acid, ethyl ester.

In accord with a process aspect of the present invention the novel compounds of this invention are synthesized by the following schematic sequence of reactions.

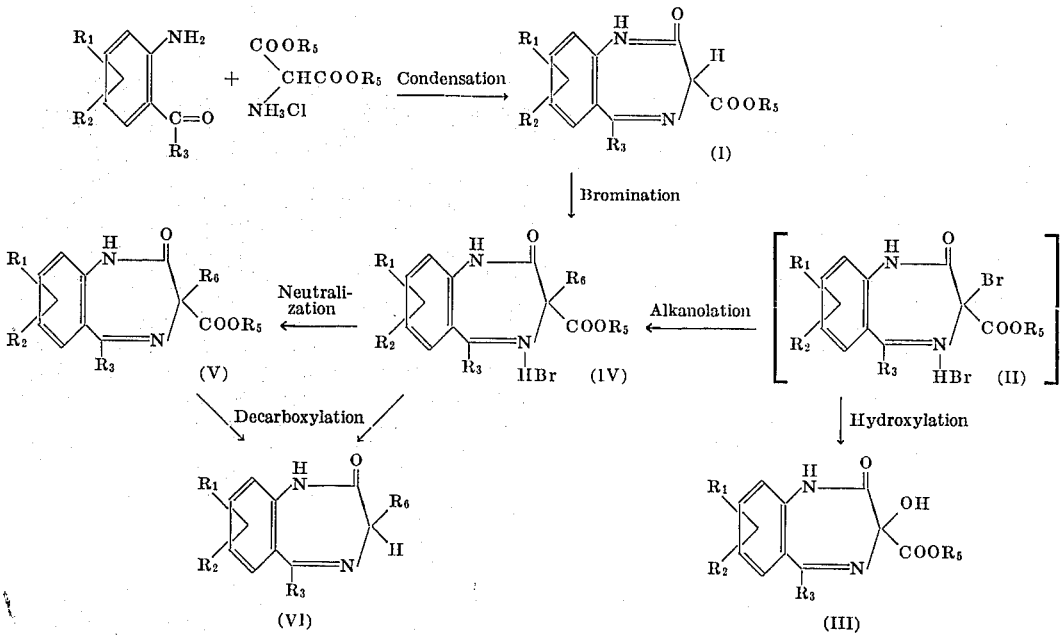

The condensation reaction between a slight molar excess of a dialkylaminomalonate and an appropriate 2-aminobenzoyl compound is effected by heating a mixture of these reactants in pyridine at a temperature from about 80° C. to about 150° C. for a period of from about 4 to about 16 hours. Preferably this reaction is conducted at the reflux temperature of the reaction mixture for about 5 hours. After the reaction is complete, the reaction mixture is cooled and the 2,3-dihydro-2-oxo-1H-1,4-benzodiazepine-3-carboxylic acid ester (I) is obtained by conventional methods such as extraction, concentration and crystallization.

When it is desired to prepare a 2,3-dihydro-3-hydroxy-2-oxo-1H-1,4-benzodiazepine-3-carboxylic acid ester (III) of this invention, an above prepared 2,3-dihydro-2-oxo-1H-1,4-benzodiazepine-3-carboxylic acid ester (I) is brominated by contact with a slight molar excess of bromine, in a reaction inert organic solvent, in the presence of a free radical initiator. When the reaction is complete, the excess bromine is removed and the 3-bromo-2,3-dihydro-2-oxo-1H-1,4-benzodiazepine-3-carboxylic acid ester hydrobromide intermediate (II) is hydroxylated by addition of an alkali metal hydroxide. Preferably the bromination reaction is conducted in methylene chloride in the presence of dibenzoyl peroxide, the excess bromine is removed by evaporation under vacuum and the hydroxylation is accomplished by the addition of sodium hydroxide. When the hydroxylation is complete, the resulting 2,3-dihydro-3-hydroxy-2-oxo-1H-1,4-benzodiazepine-3-carboxylic acid ester (III) may be obtained by conventional recovery procedures.

Alternatively, when it is desired to synthesize a 3-alkoxy-2,3-dihydro-2-oxo-1H-1,4-benzodiazepine-3-carboxylic acid ester hydrobromide (IV) and a 3-alkoxy-2,3-dihydro-2-oxo-1H-1,4-benzodiazepine-3-carboxylic acid ester (V) of the present invention, the bromination and alkanolation steps may be carried out simultaneously or separately as hereinbefore described in the preparation of the 2,3-dihydro-3-hydroxy-2-oxo-1H-1,4-benzodiazepine-3-carboxylic acid esters (III). When these steps are carried out simultaneously, an appropriate 2,3-dihydro-2-oxo-1H-1,4-benzodiazepine-3-carboxylic acid ester (I) is admixed with a slight molar excess of bromine and an alkanol, in a reaction inert organic solvent containing a free radical initiator. The particular alkanol employed will determine the particular alkoxy substituent ($R_6$), for example, if ethanol is employed the ($R_6$) substituent will be an ethoxy group. When the reaction is complete, the resulting 3-alkoxy-2,3-dihydro-2-oxo-1H-1,4-benzodiazepine-3-carboxylic acid ester, hydrobromide (IV) is separated and purified by concentration and crystallization.

The 3-alkoxy-2,3-dihydro-2-oxo-1H-1,4-benzodiazepine-3-carboxylic acid ester hydrobromides (IV) of the present invention may be converted to the corresponding free ester (V) by reacting the ester hydrobromide (IV) with a base. Preferably, this reaction is conducted in a reaction inert organic solvent, such as chloroform by contact with a saturated sodium bicarbonate aqueous solution. When neutralization is complete, the 3-alkoxy-2,3-dihydro-2-oxo-1H-1,4-benzodiazepine-3-carboxylic acid ester (V) is obtained by standard recovery procedures well known to those skilled in the chemical art, e.g., extraction, evaporation and crystallization.

Decarboxylation of a 3-alkoxy-2,3-dihydro-2-oxo-1H-1,4-benzodiazepine-3-carboxylic acid ester, (V) or its corresponding hydrobromide (IV) is accomplished by dissolving the ester (V) or hydrobromide (IV) in water or an alkanol in the presence of an alkali metal hydroxide at a temperature ranging from about 40° C. to about 60° C. for a period of from 4 to 24 hours. Preferably, this decarboxylation is conducted at a temperature about 55° C. for approximately 16 hours. When the ester hydrolysis is complete, the compound is decarboxylated by the addition of a mineral acid and the crystalline 3-alkoxy-1,3-dihydro-2H-1,4-benzodiazepin-2-one (VI) is obtained by filtration and recrystallization of the resulting precipitate.

In accord with another process aspect of the present invention, a 3-alkoxy-1,3-dihydro-2H-1,4-benzodiazepin-2-one (VI) is converted to its corresponding 1,3-dihydro-3-hydroxy-2H-1,4-benzodiazepin-2-ones (VII). This process is exemplified in the following reaction scheme:

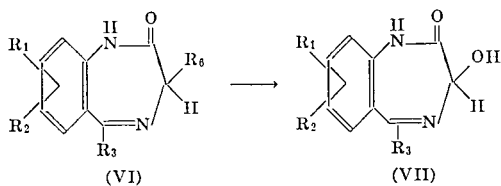

wherein $R_1$, $R_2$, $R_3$ and $R_6$ are as defined above, except that $R_3$ is not lower alkoxyphenyl in formula (VII).

Dealkylation of a 3-alkoxy-1,3-dihydro-2H-1,4-benzoidiazepin-2-one (VI) is accomplished by admixture with boron tribromide, in an inert atmosphere, at a temperature from about 0° C. to about 40° C. for a period of about 15 minutes to about 5 hours. Preferably this reaction is conducted in a nitrogen atmosphere at a temperature about 25° C. for 1 hour. After the reaction is complete, the reaction mixture is cooled, filtered and the filtrate neutralized by the addition of a base. Thereafter, a crystalline 1,3-dihydro-3-hydroxy-2H-1,4-benzodiazepin-2-one (VII) is separated by standard methods, such as, filtration and recrystallization.

By reaction-inert organic solvent as employed herein is meant an organic solvent which dissolves the reactants but will not prevent or interfere with their interaction. For example, some such solvents are methylene chloride, benzene, 1,2-dimethoxyethane, tetrahydrofuran, dioxane, carbon tetrachloride and chloroform. A free radical initiator is defined as a catalyst for a free radical chemical reaction, examples of such catalysts are sunlight, dibenzoyl peroxide, benzoyl peroxide and acetyl peroxide. Mineral acids, as employed herein, are exemplified by the following: hydrochloric acid, hydrobromic acid, hydroiodic acid, nitric acid, sulfuric acid and phosphoric acid. The time and temperature ranges employed above are not critical and simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time. The amount of solvent used in the aforesaid reactions is not critical, it being only necessary to use a sufficient amount of solvent to provide a reaction medium for the particular reactants.

Many of the reactants employed in the processes of this invention are known compounds which are readily available from commercial sources, while the remainder can easily be prepared in accordance with standard organic procedures well known to those skilled in the art.

In accord with the present invention, the new and novel 2,3-dihydro-2-oxo-1H-1,4-benzodiazepine-3-carboxylic acid esters; 2,3-dihydro-3-hydroxy-2-oxo-1H-1,4-benzodiazepine-3-carboxylic acid esters and 3-alkoxy-2,3-dihydro-2-oxo-1H-1,4-benzodiazepine-3-carboxylic acid esters of the present invention have been found to possess interesting pharmaceutical properties which render them useful as synthetic medicinals. More particularly, these compounds, in standard pharmacological tests, have exhibited utility as central nervous system depressants. In addition to their pharmacological utility, these new and novel compounds may be utilized as intermediates in the production of 3-alkoxy-1,3-dihydro-2H-1,4-benzodiazepin-2-ones, and 1,3-dihydro-3-hydroxy-2H-1,4-benzodiazepin-2-ones.

When the compounds of this invention are employed as central nervous system depressants, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 1 mg. to about 500 mg. per kg. of body weight per day, although as aforementioned variations will occur. However, a dosage level that is in the range of from about 5 mg. to about 50 mg. per kg. of body weight per day is most desirably employed in order to achieve effective results.

The following examples are given by way of illustration and are not to be construed as limitations of this invention, many variations of which are possible without departing from the scope and spirit thereof.

EXAMPLE I

2-Amino-5-chlorobenzophenone (44.0 g., 0.190 mole) and 20.0 g. (0.095 mole) of diethylaminomalonate hydrochloride dissolved in 140 ml. of pyridine are heated at reflux in an oil bath (temperature 150° C.) for 1 hour. An additional 30.0 g. (.142 mole) of diethylaminomalonate hydrochloride is added in three, 20-ml. portions of pyridine at half hour intervals. A constant volume of solvent is maintained by distillation of pyridine from the reaction mixture during the addition period. After a total reaction time of 4.75 hours, the pyridine is removed in vacuo and the viscous residue is taken up in benzene and extracted with three portions of water. The benzene extract is dried over anhydrous magnesium sulfate and concentrated in vacuo to a viscous oil. Treatment of the oil with 140 ml. of acetonitrile yields 8.65 g. (13.2%) of 7-chloro-2,3-dihydro-2-oxo-5-phenyl-1H-1,4-benzodiazepine-3-carboxylic acid, ethyl ester, m.p. 227°–228° C.

Calcd. for $C_{18}H_{15}N_2O_3Cl$: C, 63.08; H, 4.41; Cl, 10.35; N, 8.17.

Found: C, 63.09; H, 4,23; Cl, 10.7; N, 8.52.

In a similar manner, 2-aminobenzophenone is reacted with dimethylaminomalonate hydrochloride to obtain 2,3-dihydro-2-oxo-5-phenyl-1H-1,4-benzodiazepine-3-carboxylic acid, methyl ester.

EXAMPLE II

2-Amino-5-nitrobenzophenone (45.0 g.) and (20.0 g.) of diethylaminomalonate hydrochloride dissolved in 150 ml. of pyridine are heated at reflux in an oil bath for 1 hour. Additional 30.0 g. of diethylaminomalonate hydrochloride is added in three portions at 20-minute intervals in 25-ml. portions of pyridine. A constant volume of solvent is maintained by distillation of pyridine from the reaction mixture during the addition period. After a total reaction time of 12 hours, the pyridine is removed in vacuo and the viscous residue is taken up in benzene and extracted with three portions of water. The benzene extract is dried over anhydrous magnesium sulfate and concentrated in vacuo to a viscous oil. Treatment of the oil with ethanol yields 2,3-dihydro-7-nitro-2-oxo-5-phenyl-1H-1,4-benzodiazepine-3-carboxylic acid, ethyl ester.

In a similar manner, 2-amino-6-ethyl sulfonylbenzophenone is reacted with diethylaminomalonate hydrochloride to synthesize 6-ethylsulfonyl-2,3-dihydro-2-oxo-5-phenyl-1H-1,4-benzodiazepine-3-carboxylic acid, ethyl ester.

EXAMPLE III

2-Amino-5-bromobenzophenone (40.0 g.) and (20.0 g.) of dipropylaminomalonate hydrochloride dissolved in 150 ml. of pyridine are heated at reflux for 1 hour. An additional 30.0 g. of dipropylaminonomalonate hydrochloride is added in three portions at half hour intervals in 20-ml. portions of pyridine. A constant volume of solvent is maintained by distillation of pyridine from the reaction mixture during the addition period. After a total reaction time of 16 hours, the pyridine is removed in vacuo and the viscous residue is taken up in benzene and extracted with water. The benzene extract is dried over anhydrous magnesium sulfate and concentrated in vacuo. Recrystallization from methanol yields 7-bromo-2,3-dihydro-2-oxo-5-phenyl-1H-1,4-benzodiazepine-3-carboxylic acid, propyl ester.

Similarly, 7,9-dichloro-2,3-dihydro-2-oxo-5-phenyl-1H-1,4-benzodiazepine-3-carboxylic acid, ethyl ester is synthesized.

EXAMPLE IV

When the procedure of Examples I to III is employed, reacting an appropriate 2-aminobenzoyl compound with a di(lower)alkylaminomalonate, the following 2,3-dihydro-2-oxo-1H-1,4-benzodiazepine-3-carboxylic acid esters are obtained:

7-trifluoromethyl-2,3-dihydro-2-oxo-5-(2-thienyl)-1H-1,4-benzodiazepine-3-carboxylic acid, methyl ester;

8-dichloromethyl-5-(p-chlorophenyl)-2,3-dihydro-2-oxo-1H-1,4-benzodiazepine-3-carboxylic acid, propyl ester;

2,3-dihydro-7-methylsulfonyl-2-oxo-5-(p-tolyl)-1H-1,4-benzodiazepine-3-carboxylic acid, ethyl ester;

5-(m-chlorophenyl)-2,3-dihydro-2-oxo-1H-1,4-benzodiazepine-3-carboxylic acid, methyl ester;

2,3-dihydro-8-iodo-5-(p-methoxyphenyl)-2-oxo-1H-1,4-benzodiazepine-3-carboxylic acid, ethyl ester;

5-(p-trifluoromethylphenyl)-2,3-dihydro-2-oxo-1H-1,4-benzodiazepine-3-carboxylic acid,methyl ester;

8-chloro-5-(m-ethylphenyl)-2,3-dihydro-2-oxo-1H-1,4-benzodiazepine-3-carboxylic acid, butyl ester;

5-(p-chlorophenyl)-2,3-dihydro-2-oxo-1H-1,4-benzodiazepine-3-carboxylic acid, ethyl ester;

7-chloro-2,3-dihydro-2-oxo-5-(p-propoxyphenyl)-1H-1,4-benzodiazepine-3-carboxylic acid, methyl ester; and 7-chloro-5-(o-chlorophenyl)-2,3-dihydro-2-oxo-1H-1,4-benzodiazepine-3-carboxylic acid, ethyl ester.

EXAMPLE V

7-Chloro-2,3-dihydro-2-oxo-5-phenyl-1H-1,4-benzodiazepine-3-carboxylic acid, ethyl ester (1.50 g., 4.38 m mole) dissolved in 75 ml. of methylene chloride and 0.5 ml. of methanol is treated with a solution of 0.842 g. (5.27 m mole) of bromine. The mixture is then treated with 30 mg. of dibenzoyl peroxide and stirred at 27° C. for 61 hours. Thereafter the solvent and excess reagent are evaporated on the rotary evaporator to give an orange oil. Treatment of the oil with ethyl acetate affords 1.185 g. of 7-chloro-2,3-dihydro-3-methoxy-2-oxo-5-phenyl-1H-1,4-benzodiazepine-3-carboxylic acid, ethyl ester, hydrobromide as yellow crystals, m.p. 180°–181°C.

7-Chloro-2,3-dihydro-3-methoxy-5-phenyl-2-oxo-1H-1,4-benzodiazepine-3-carboxylic acid, ethyl ester, hydrobromide (0.8 g.) partially dissolved in 15 ml. of chloroform is agitated with 10 ml. of saturated sodium bicarbonate solution. The chloroform extract is washed with water and dried over anhydrous magnesium sulfate. Evaporation of the chloroform leaves an oily residue which crystallizes in ethanol-water. Recrystallization from ethanol-water yields 0.45 g. of 7-chloro-2,3-dihydro-3-methoxy-2-oxo-5-phenyl-1H-1,4-benzodiazepine-3-carboxylic acid, ethyl ester, m.p. 168°–170° C.

Calcd. for $C_{19}H_{17}ClN_2O_4$: C, 61.22; H, 4.60; Cl, 9.51; N, 7.52.
Found: C, 60.96; H, 4.63; Cl, 9.7; N, 7.33.

Similarly, 2,3-dihydro-2-oxo-5-phenyl-1H-1,4-benzodiazepine-3-carboxylic acid, methyl ester is dissolved in benzene and ethanol and then treated with bromine and dibenzoyl peroxide to produce 3-ethoxy-2,3-dihydro-2-oxo-5-phenyl-1H-1,4-benzodiazepine-3-carboxylic acid, methyl ester, hydrobromide. When the hydrobromide is neutralized as described above, there is obtained 3-ethoxy-2,3-dihydro-2-oxo-5-phenyl-1H-1,4-benzodiazepine-3-carboxylic acid, methyl ester.

EXAMPLE VI 2,3-dihydro-7-nitro-2-oxo-5-phenyl-1H-1,4-benzodiazepine-3-carboxylic acid, ethyl ester (1.50 g.) dissolved in 75 ml. of benzene and 0.94 ml. of propanol is treated with a solution of 0.84 g. of bromine. The mixture is treated with 30 mg. of benzoyl peroxide and stirred at 25° C. for 50 hours. The solvent and excess reagent are then evaporated on the rotary evaporator. Treatment of the residue with ether affords 2,3-dihydro-7-nitro-2-oxo-5-phenyl-3-propoxy-1H-1,4-benzodiazepine-3-carboxylic acid, ethyl ester, hydrobromide.

The above prepared 2,3-dihydro-7-nitro-2-oxo-5-phenyl-3-propoxy-1H-1,4-benzodiazepine-3-carboxylic acid, ethyl ester, hydrobromide partially dissolved in chloroform is agitated with 25 ml. of saturated sodium bicarbonate solution. The chloroform extract is washed with water and dried over anhydrous magnesium sulfate. Evaporation of the chloroform leaves a residue which crystallizes in ethanol-water. Recrystallization from ethanol-water yields 2,3-dihydro-7-nitro-2-oxo-5-phenyl-3-propoxy-1H-1,4-benzodiazepine-3-carboxylic acid, ethyl ester.

EXAMPLE VII

7-Bromo-2,3-dihydro-2-oxo-5-phenyl-1H-1,4-benzodiazepine-3-carboxylic acid, ethyl ester (3.0 g.) dissolved in 150 ml. of 1,2-dimethoxyethane and 1.3 ml. of ethanol is treated with a solution of 1.49 g. of bromine. The mixture is treated with 60 mg. of acetyl peroxide and stirred at 30° C. for 45 hours. The solvent and excess reagent are evaporated on the rotary evaporator. Treatment of the residue with ethyl acetate affords 7-bromo-3-ethoxy-2,3-dihydro-2-oxo-5-phenyl-1H-1,4-benzodiazepine-3-carboxylic acid, ethyl ester, hydrobromide.

7-Bromo-3-ethoxy-2,3-dihydro-2-oxo-5-phenyl-1H-1,4-benzodiazepine-3-carboxylic acid, ethyl ester, hydrobromide partially dissolved in 50 ml. of chloroform is agitated with 10 ml. of 1N sodium hydroxide solution. The chloroform extract is washed with water, dried over anhydrous magnesium sulfate and evaporated. The residue is crystallized in methanol-water to yield 7-bromo-3-ethoxy-2,3-dihydro-2-oxo-5-phenyl-1H-1,4-benzodiazepine-3-carboxylic acid, ethyl ester.

EXAMPLE VIII

Employing the procedures described in Examples V to VII, the following 2,3-dihydro-2-oxo-1H-1,4-benzodiazepine-3-carboxylic acid esters are prepared:

7-trifluoromethyl-2,3-dihydro-3-methoxy-2-oxo-5-(2-thienyl)-1H-1,4-benzodiazepine-3-carboxylic acid, methyl ester;

8-dichloromethyl-5-(p-chlorophenyl)-2,3-dihydro-2-oxo-3- propoxy-1H-1,4-benzodiazepine-3-carboxylic acid, propyl ester; and 3-butoxy-2,3-dihydro-7-methylsulfonyl-2-oxo-5-phenyl-1H-1,4-benzodiazepine-3-carboxylic acid, ethyl ester.

EXAMPLE IX

7-Chloro-2,3-dihydro-2-oxo-5-phenyl-1H-1,4-benzodiazepine-3-carboxylic acid, ethyl ester (1.50 g., 4.38 m mole) dissolved in 75 ml. of methylene chloride and 0.5 ml. of methanol is treated with a solution of 0.842 g. (5.27 m mole) of bromine. The mixture is treated with 30 mg. of dibenzoyl peroxide and stirred at 27° C. for 61 hours. The solvent and excess reagent are evaporated on the rotary evaporator to an orange oil residue. Treatment of the oil with ethyl acetate affords 1.185 g. of 7-chloro-2,3-dihydro-3-methoxy-2-oxo-5-phenyl-1H-1,4-benzodiazepine-3-carboxylic acid, ethyl ester, hydrobromide as yellow crystals, m.p. 180°–181° C. The crystalline material is carried to the next step without additional purification.

The unpurified above prepared 7-chloro-2,3-dihydro-3-methoxy-2-oxo-5-phenyl-1H-1,4-benzodiazepine-3-carboxylic acid, ethyl ester, hydrobromide (455 mg., 1.0 m mole) is slurried in 6 ml. of water and 1 ml. of 4N sodium hydroxide and the mixture is stirred and heated at 50° C. Initially all the solid dissolves but after 5 minutes 300 mg. of a white crystalline sodium salt separates. A 261 mg. portion of the sodium salt is heated at 58° C. in a solution of 0.8 ml. of 4N sodium hydroxide for 16 hours. Acidification of the chilled solution with 1N hydrochloric acid yields 30 mg. of crude product, m.p. 183°–187° C. Recrystallization from acetonitrile yields 7-chloro-1,3-dihydro-3-methoxy-5-phenyl-2H-1,4-benzodiazepin-2-one, m.p. 230°–233° C.

EXAMPLE X

The unpurified 2,3-dihydro-7-nitro-2-oxo-5-phenyl-3-propoxy-1H-1,4-benzodiazepine-3-carboxylic acid, ethyl ester, hydrobromide (492 mg.), as prepared in Example VI, is slurried in 6 ml. of ethanol and 2 ml. of 2N potassium hydroxide and the mixture stirred and heated at 25° C. for 20 minutes. Thereafter, the precipitated material is again heated at 40° C. in 6.0 ml. of 1N potassium hydroxide for 24 hours. Upon cooling, the solution is acidified with 0.5 N sulfuric acid. The resulting precipitate is recrystallized from ethanol to obtain 1,3-dihydro-7-nitro-5-phenyl-3-propoxy-2H-1,4-benzodiazepin-2-one.

Similarly, 7-trifluoromethyl-1,3-dihydro-3-methoxy-5-(2-thienyl)-2H-1,4-benzodiazepin-2-one is obtained.

EXAMPLE XI

The unpurified 7-bromo-3-ethoxy-2,3-dihydro-2-oxo-5-phenyl-1H-1,4-benzodiazepine-3-carboxylic acid, ethyl ester, hydrobromide (1.28 g., 2.5 m mole), as prepared in Example VII, is slurried in 12 ml. of methanol and 2 ml. of 5N sodium hydroxide and the mixture is stirred and heated at 75° C. for 5 minutes. Thereafter, the precipitated material is separated and admixed with 2.75 ml. of 5N sodium hydroxide and heated at 50° C. for 5 hours. Upon cooling, the reaction mixture is acidified with 1N hydrochloric acid and the resulting precipitate recrystallized from methanol to yield 7-bromo-3-ethoxy-1,3-dihydro-5-pheny-2H-1,4-benzodiazepin-2-one.

Employing the above described procedure, the following compounds are obtained:

5-(p-trifluoromethylphenyl)-1,3-dihydro-3-methoxy-2H-1,4-benzodiazepin-2-one;

3-butoxy-8-chloro-5-(m-ethylphenyl)-1,3-dihydro-2H-1,4-benzodiazepin-2-one;

5-(p-dichloromethylphenyl)-1,3-dihydro-3-methoxy-2H-1,4-benzodiazepin-2-one;

3-ethoxy-1,3-dihydro-7-methylsulfonyl-5- phenyl -2H-1,4-benzodiazepin-2-one; and 3-ethoxy-1,3-dihydro-5-phenyl-2H-1,4-benzodiazepin-2-one.

EXAMPLE XII

7-Chloro-2,3-dihydro-2-oxo-5-phenyl-1H-1,4-benzodiazepine-3-carboxylic acid, ethyl ester (1.50 g., 4.38 m mole) dissolved in 75 ml. of methylene chloride and 0.5 ml. of methanol is treated with a solution of 0.842 g. (5.27 m mole) of bromine. The mixture is treated with 30 mg. of dibenzoyl peroxide and stirred at 27° C. for 61 hours. The solvent and excess reagent are evaporated on the rotary evaporator to give an orange oil. Treatment of the oil with ethyl acetate affords 1.185 g. of 7-chloro-2,3-dihydro-3-methoxy-2-oxo-5-phenyl-1H-1,4-benzodiazepine-3-carboxylic acid, ethyl ester, hydrobromide as yellow crystals, m.p. 180°–181° C. The crystalline material is carried to the next step without additional purification.

The unpurified above prepared 7-chloro-2,3-dihydro-3-methoxy-2-oxo-5-phenyl-1H-1,4-benzoidiazepine-3-carboxylic acid, ethyl ester, hydrobromide (455 mg., m mole) is slurried in 6 ml. of water and 1 ml. of 4N sodium hydroxide and the mixture is stirred and heated at 50° C. Initially all the solid dissolves but after five minutes 300 mg. of a white crystalline sodium salt separates. A 261 mg. portion of the sodium salt is heated at 58° C. in a solution of 0.8 ml. of 4N sodium hydroxide for 16 hours. Acidification of the chilled solution with 1N hydrochloric acid yields 30 mg. of crude product, m.p. 183°–187° C. Recrystallization from acetonitrile yields 7-chloro-1,3-dihydro-3-methoxy-5-phenyl-2H-1,4-benzodiazepin-2-one, m.p. 230°–233° C.

7-Chloro-1,3-dihydro-3-methoxy-5-phenyl-2H-1,4-benzodiazepin-2-one (500 mg., 1.67 m mole) is added as a finely divided powder to 10 ml. of boron tribromide at 27° C. The slurry is then stirred in a nitrogen atmosphere at 27° C. for 45 minutes and at 35° C. for 15 minutes. The slurry is poured slowly into 200 g. of ice-water with stirring and the mixture is allowed to warm to room temperature. The boric acid which separates is filtered, the filtrate neutralized with 4N sodium hydroxide (pH 7–8) and the resulting white solid (m.p. 194°–198° C.) which separates (approx. 500 mg.) is filtered and washed with water. Recrystallization of this material yields 151 mg. of 7-chloro-1,3-dihydro-3-hydroxy-5-phenyl-2H-1,4-benzoidiazepin-2-one, m.p. 199°–200° C.

EXAMPLE XIII

Finely divided 7-chloro-3-ethoxy-1,3-dihydro-5-phenyl-2H-1,4-benzodiazepin-2-one (1.0 g.) is added to boron tribromide (20 ml.) at 35° C. The reaction mixture, under helium, is stirred for one hour at 25° C. and then chilled to 5° C. The resulting precipitate is removed by filtration and the filtrate neutralized with 1N potassium hydroxide. The resulting solid product is separated and washed with ethanol to yield 7-chloro-1,3-dihydro-3-hydroxy-5-phenyl-2H-1,4-benzodiazepin-2-one.

In a similar manner, 5-(p-trifluromethylphenyl)-1,3-dihydro-3-hydroxy-2H-1,4-benzodiazepin-2-one is obtained.

EXAMPLE XIV

7-Bromo-3-ethoxy-1,3-dihydro-5-phenyl-2H-1,4-benzodiazepin-2-one (0.25 g.), in a finely divided form, is added to boron tribromide (5 ml.) at 10° C. under a helium atmosphere and the mixture is stirred for 1 hour at 40° C. Thereafter, the reaction mixture is slowly poured into 75 g. of ice and the mixture allowed to stand for 12 hours. Subsequently, the boric acid is removed by filtration, and the filtrate neutralized by the addition of 3N sodium hydroxide. The resulting precipitate is 7-bromo-1,3-dihydro-3-hydroxy-5-phenyl-2H-1,4-benzodiazepin-2-one.

EXAMPLE XV

Employing the general procedure described in Examples XIII and XIV, the following 3-hydroxy-1,3-dihydro-2H-1,4-benzodiazepin-2-ones are produced:

8-chloro-5-phenyl-1,3-dihydro-3-hydroxy-2H-1,4-benzodiazepin-2-one;

7-trifluoromethyl-1,3-dihydro-3-hydroxy-5-(2-thienyl)-2H-1,4-benzodiazepin-2-one;

5-(p-chlorophenyl)-1,3-dihydro-3-hydroxy-2H-1,4-benzodiazepin-2-one;

1,3-dihydro-3-hydroxy-5-phenyl-2H-1,4-benzodiazepin-2-one; and 7-chloro-5-(o-chlorophenyl)-1,3-dihydro-3-hydroxy-2H-1,4-benzodiazepin-2-one.

EXAMPLE XVI

A solution of 4.00 g. (11.7 m mole) of 7-chloro-2,3-dihydro-2-oxo-5-phenyl-1H-1,4-benzodiazepine-3-carboxylic acid, ethyl ester in 225 ml. of chloroform containing 0.75 percent of ethanol is slowly admixed with a solution of 2.30 g. (14.4 m mole) of bromine in 25 ml. chloroform and the resulting orange solution is stirred at 26° C. for 20 hours. Thereafter, the solvent and excess bromine are removed on the rotary evaporator leaving an orange residue. Treatment of the residue with ethyl acetate yields 2.65 g. of yellow solid hydrobromide. A 1.1 g. portion of the solid is twice recrystallized from ethanol water to give 0.467 g. of 7-chloro-2,3-dihydro-3-ethoxy-2-oxo-5-phenyl-1H-1,4-benzodiazepine-3-carboxylic acid, ethyl ester, hemiethanolate, m.p. 164°–166° C.

Calcd. for $C_{20}H_{19}ClN_2O_4 \cdot 1/2\ C_2H_5OH$: C, 61.53; H, 5.41; Cl, 8.65; N, 6.84
Found: C, 61.46; H, 5.44; Cl, 8.7; N, 6.81.

EXAMPLE XVII

7-Chloro-2,3-dihydro-2-oxo-5-phenyl-1H-1,4-benzodiazepine-3-carboxylic acid, ethyl ester (5.00 g., 14.5 m mole) dissolved in 200 ml. of methylene chloride is gradually admixed with 2.79 g. (17.5 m mole) of bromine in 50 ml. of methylene chloride. The solution is treated with 75 mg. of dibenzoyl peroxide and stirred at 27° C. for 16 hours. The solvent and excess bromine are evaporated in vacuo and the residue dissolved in 50 ml. of 1,2-dimethoxyethane and 20 ml. of water. The mixture is adjusted to pH 8 (Hydrion paper) with 4N sodium hydroxide solution and stirred for 35 minutes at 27° C. The volatile solvents are removed in vacuo and the mixture treated with 17 ml. of 4N sodium hydroxide, thereby causing a yellow solid to separate (5.4 g.).

A 4.0 g. portion of this solid is partially dissolved in 25 ml. of aqueous ethanol, filtered, and the filtrate acidified dropwise with 6N hydrochloric acid. Filtration of the needles which separate yields 1.1 g. of crude product, m.p. 174°–178° C. When recrystallized from acetonitrile, there is obtained 7-chloro-2,3-dihydro-3-hydroxy-2-oxo-5-phenyl-1H-1,4-benzodiazepine-3-carboxylic acid, ethyl ester, m.p. 180°–181.5° C.

Calcd. for $C_{18}H_{15}ClN_2O_4$: C, 60.24; H, 4.21; Cl, 9.88; N, 7.81
Found: C, 60.51; H, 4.30; Cl, 9.86; N, 8.14.

In a similar manner, 8-dichloromethyl-5-(p-chlorophenyl)-2,3-dihydro-3-hydroxy-2-oxo-1H-1,4-benzodiazepine-3-carboxylic acid, methyl ester; 7-trifluoromethyl-2,3-dihydro-3-hydroxy-2-oxo-5-(2-thienyl)-1GH-1,4-benzodiazepine-3-carboxylic acid, propyl ester; and 2,3-dihydro-3-hydroxy-7-nitro-2-oxo-5-phenyl-1H-1,4-benzodiazepine-3-carboxylic acid, ethyl ester are produced.

EXAMPLE XVIII

7-Bromo-2,3-dihydro-2-oxo-5-phenyl-1H-1,4-benzodiazepine-3-carboxylic acid, ethyl ester (15.0 g.) dissolved in 200 ml. of dioxane is treated gradually with 9.0 g. of bromine in 150 ml. of dioxane. The solution is admixed with 250 mg. of benzoyl peroxide and stirred at 20° C. for 24 hours. The solvent and excess bromine are evaporated in vacuo and the residue dissolved in 150 ml. of 1,2-dimethoxyethane and 60 ml. of water. The mixture is adjusted to pH 8 (Hydrion paper) with 1N potassium hydroxide solution and stirred for 20 minutes at 20° C. The volatile solvents are removed in vacuo and the mixture treated with about 90 ml. of 2N potassium hydroxide. The resulting precipitate is dissolved in 100 ml. of aqueous methanol, filtered, and the filtrate acidified by the addition of 2N hydrochloric acid. The resulting precipitate is filtered and recrystallized from ethanol to obtain 7-bromo-2,3-dihydro-3-hydroxy-2-oxo-5-phenyl-1H-1,4-benzodiazepine-3-carboxylic acid, ethyl ester.

Employing the above procedure, the following compounds are obtained:

8-chloro-5-(p-chloropenyl)-2,3-dihydro-3-hydroxy-2-oxo-1H-1,4-benzodiazepine-3-carboxylic acid, methyl ester; and 2,3-dihydro-3-hydroxy-2-oxo-5-phenyl-1H-1,4-benzodiazepine-3-carboxylic acid, propyl ester.

EXAMPLE XIX 7,8-Dichloro-2,3-dihydro-2-oxo-5-phenyl-1H-1,4-benzodiazepine-3-carboxylic acid, methyl ester (5.00 g.) dissolved in 200 ml. of tetrahydrofuran is gradually admixed with 3.0 g. of bromine in 50 ml. of tetrahydrofuran. The solution is treated with 85 mg. of acetyl peroxide and stirred at 10° C. for 40 hours. The solvent and excess bromine are evaporated in vacuo and the residue dissolved in 50 ml. of 1,2-dimethoxyethane and 20 ml. of water. The mixture is adjusted to pH 8 with 1N potassium hydroxide solution and stirred for 1 hour at 25° C. The volatile solvents are removed in vacuo and the mixture treated with 1N potassium hydroxide, causing a solid to separate. The solid is separated, dissolved in aqueous ethanol and acidified. The resulting precipitate is separated and recrystallized from methanol to yield 7,8-dichloro-2,3-dihydro-3-hydroxy-2-oxo-5-phenyl-1H-1,4-benzodiazepine-3-carboxylic acid, methyl ester.

What is claimed is:

1. A compound selected from the group consisting of those having the formula:

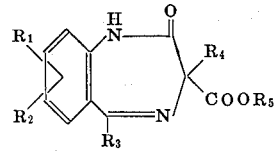

wherein $R_1$ and $R_2$ are each selected from the group consisting of hydrogen, halogen, nitro, halo(lower)alkyl, and lower alkylsulfonyl; $R_3$ is selected from the group consisting of thienyl, phenyl, halophenyl, lower alkoxyphenyl, and halo(lower)alkylphenyl; $R_4$ is selected from the group consisting of, hydroxy and lower alkoxy; and $R_5$ is (lower) alkyl.

2. 7-chloro-2,3-dihydro-3-hydroxy-2-oxo-5-phenyl-1H-1,4-benzodiazepine-3-carboxylic acid, ethyl ester.

3. A compound as described in claim 1 which is: 7-chloro-2,3-dihydro-3-hydroxy-2-oxo-5-phenyl-1H-1,4-benzodiazepine-3-carboxylic acid, ethyl ester.

4. A compound as described in claim 1 which is: 7-chloro-2,3-dihydro-3-ethoxy-2-oxo-5-phenyl-1H-1,4-benzodiazepine-3-carboxylic acid, ethyl ester, hemi ethanolate.

5. A compound as described in claim 1 which is: 7-chloro-2,3-dihydro-3-methoxy-2-oxo-5-phenyl-1H-1,4-benzodiazepine-3-carboxylic acid, ethyl ester.

6. A process which comprises:
   a. condensing a di(lower)alkylaminomalonate with a 2-aminobenzoyl compound of the formula:

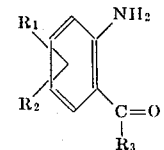

wherein $R_1$ and $R_2$ are each selected from the group consisting of hydrogen, halogen, nitro, halo(lower)alkyl, and lower alkylsulfonyl and $R_3$ is selected from the group consisting of thienyl, phenyl, halophenyl, lower alkoxyphenyl, and halo(lower)alkylphenyl, in pyridine, to form a 2,3-dihydro-2-oxo-1H-1,4-benzodiazepine-3-carboxylic acid ester;
  b. brominating and alkanolating said carboxylic acid ester to form a 3-alkoxy-2,3-dihydro-2-oxo-1H-1,4-benzodiazepine-3-carboxylic acid ester, hydrobromide;
  c. neutralizing, hydrolyzing and decarboxylating said 3-alkoxy-3-carboxylic acid ester, hydrobromide to produce a 3-alkoxy-1,3-dihydro-2H-1,4-benzodiazepine-2-one of the formula:

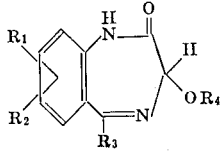

wherein $R_1$, $R_2$ and $R_3$ are defined as above and $R_4$ is alkyl.

7. A process as described in claim 6 wherein:
  a. the bromination and alkanolation are conducted, in a reaction-inert organic solvent, in the presence of a free radical initiator;
  b. the neutralization and the hydrolysis are conducted by the addition of an alkali metal hydroxide; and
  c. the decarboxylation is conducted by the addition of a mineral acid.

8. A process as described in claim 6 wherein:
  a. the bromination and alkanolation are conducted, in methylene chloride, in the presence of dibenzoyl peroxide;
  b. the neutralization and the hydrolysis are conducted by the addition of sodium hydroxide; and
  c. the decarboxylation is conducted by the addition of hydrochloric acid.

9. A process for the production of a compound of the formula:

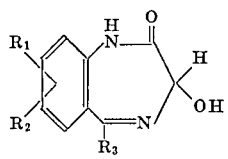

wherein $R_1$ and $R_2$ are each selected from the group consisting of hydrogen, halogen, nitro, halo(lower)alkyl and lower alkylsulfonyl and $R_3$ is selected from the group consisting of thienyl, halophenyl, and halo(lower)alkylphenyl, which comprises contacting a compound selected from the group consisting of those having the formula:

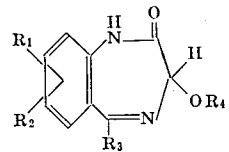

wherein $R_1$, $R_2$ and $R_3$ are defined as above and $R_4$ is lower alkyl with boron tribromide, in an inert atmosphere, at a temperature range from about 0° C. to about 40° C. for a period of from about 15 minutes to about 5 hours.

10. A process as described in claim 9 wherein:
  a. the inert atmosphere is nitrogen;
  b. the temperature is about 25° C.; and
  c. the reaction period is about 1 hour.

11. A process which comprises:
  a. condensing a dialkylaminomalonate with a 2-aminobenzoyl compound of the formula:

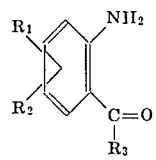

wherein $R_1$ and $R_2$ are each selected from the group consisting of hydrogen, halogen, nitro, halo(lower)alkyl and lower alkylsulfonyl and $R_3$ is selected from the group consisting of thienyl, phenyl, halophenyl, and halo(lower)alkylphenyl, in pyridine, to form a 2,3-dihydro-2-oxo-1H-1,4-benzodiazepine-3-carboxylic acid ester;
  b. brominating and alkanolating said carboxylic acid ester to form 3-alkoxy-2,3-dihydro-2-oxo-1H-1,4-benzodiazepine-3-carboxylic acid ester, hydrobromide;
  c. neutralizing, hydrolyzing and decarboxylating said carboxylic acid ester hydrobromide to obtain a 3-alkoxy-1,3-dihydro-2H-1,4-benzodiazepin-2-one; and
  d. reacting said 3-alkoxy-1,3-dihydro-2H-1,4-benzodiazepin-2-one with boron tribromide, in an inert atmosphere, at a temperature range from about 0° C. to about 40° C. for a period from about 15 minutes to about 5 hours to produce a 1,3-dihydro-3-hydroxy-2H-1,4-benzodiazepin-2-one of the formula:

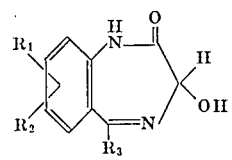

wherein $R_1$, $R_2$ and $R_3$ are defined as above.

12. A process as described in claim 11 which comprises:
  a. condensing 2-amino-5-chlorobenzophenone with a dialkylaminomalonate, in pyridine, at reflux temperatures for about five hours to form a 7-chloro-2,3-dihydro-2-oxo-5-phenyl-1H-1,4-benzodiazepine-3-carboxylic acid ester;
  b. brominating and alkanolating said carboxylic acid ester by reaction with bromine and an alkanol, in a reaction inert organic solvent in the presence of a free radical initiator to produce a 3-alkoxy-7-chloro-2,3-dihydro-2-oxo-5-phenyl-1H-1,4-benzodiazepine-3-carboxylic acid, ester, hydrobromide;
  c. neutralizing said carboxylic acid ester, hydrobromide by the addition of an alkali metal hydroxide and then hydrolyzing and decarboxylating the carboxylic acid ester to obtain a 3-alkoxy-7-chloro-1,3-dihydro-5-phenyl-2H-1,4-benzodiazepin-2-one; and
  d. reacting said 3-alkoxy-7-chloro-1,3-dihydro-5-phenyl-2H-1,4-benzodiazepin-2-one with boron tribromide, in an inert atmosphere, at a temperature range from 0° C. to about 40° C. for a period of from about 15 minutes to about 5 hours to produce 7-chloro-1,2-dihydro-3-hydroxy-5-phenyl-2H-1,4-benzodiazepin-2-one.

13. A process as described in claim 12 which comprises:
  a. condensing 2-amino-5-chlorobenzophenone with diethylaminomalonate hydrochloride, in pyridine, at reflux temperatures for five hours to form a 7-chloro-2,3-dihydro-2-oxo-5-phenyl-1H-1,4-benzodiazepine-3-carboxylic acid, ethyl ester;
  b. brominating and methanolating said carboxylic acid, ethyl ester by reaction with bromine and methanol, in methylene chloride, in the presence of dibenzoyl peroxide to produce 7-chloro-2,3-dihydro-3-methoxy-2-oxo-5-phenyl-1H-1,4-benzodiazepine-3-carboxylic acid, ethyl ester, hydrobromide;
  c. neutralizing said ethyl ester, hydrobromide by the addition of sodium hydroxide and then hydrolyzing and decarboxylating the ethyl ester to obtain 7-chloro-1,3-dihydro-3-methoxy-5-phenyl-2H-1,4-benzodiazepin-2-one; and
  d. reacting said 7-chloro-1,3-dihydro-3-methoxy-5-phenyl-2H-1,4-benzodiazepin-2-one with boron tribomide, in a nitrogen atmosphere, at about 25° C., for about one hour, to produce 7-chloro-1,3-dihydro-3-hydroxy-5-phenyl-2H-1,4-benzodiazepin-2-one.

* * * * *